Jan. 10, 1939.  E. B. G. LEFEVRE  2,143,736
GOOSENECK HINGE
Filed June 1, 1936
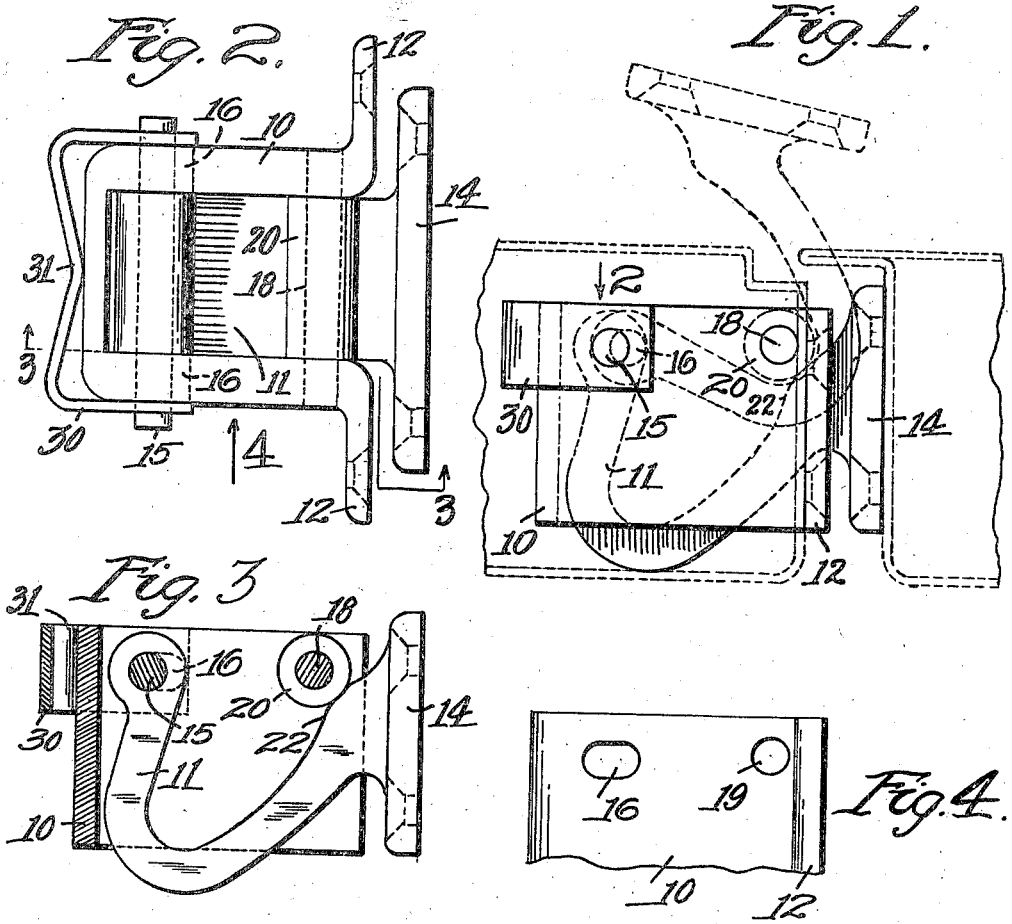
Inventor
Emil B. G. Lefevre Patented Jan. 10, 1939

2,143,736

UNITED STATES PATENT OFFICE 2,143,736

GOOSENECK HINGE

Emil B. G. Lefevre, Detroit, Mich.

Application June 1, 1936, Serial No. 82,868

1 Claim. (Cl. 16—179)

This invention relates to hinges of the gooseneck type, intended for use where a substantial "throw-out" action is required. It has been previously proposed to use gooseneck hinges on automobile doors but it was found that the usual gooseneck hinge did not provide sufficient clearance for the outwardly curved side of an automobile body.

It is the general object of my invention to provide an improved construction of gooseneck hinge, so designed that the axis of the hinge is shifted as the hinge is opened, whereby increased clearance is provided.

My invention further relates to arrangements and combinations of parts which will be hereinafter described and more particularly pointed out in the appended claim.

A preferred form of the invention is shown in the drawing, in which

Fig. 1 is a plan view of one form of my improved hinge;

Fig. 2 is a rear elevation thereof, looking in the direction of the arrow 2 in Fig. 1;

Fig. 3 is a sectional plan view, taken along the line 3—3 in Fig. 2; and

Fig. 4 is a partial plan view of the hinge casing looking in the direction of the arrow 4 in Fig. 2.

Referring to Figs. 1 to 4, my improved hinge comprises a casing 10 and a hinge member 11. The casing 10 is U-shape in section and is provided with flanged portions 12 by which it may be secured to a pillar or other part of an automobile body. The hinge portion 11 is also provided with a plate 14 by which it may be attached to an automobile door.

After the hinge member and casing are assembled, a hinge pin 15 is forced through an opening in the hinge member 11, and the ends of the pin 15 extend outward through slots 16 in the sides of the casing 10. A second pin 18, the ends of which are a force fit in openings 19 in the sides of the member 10, rotatably supports a cam roll 20 between the sides of said casing.

The hinge member 11 is provided with a cam portion 22 adapted to engage the roll 20 as the hinge is opened. A U-shaped spring 30 formed of flat spring steel is mounted at the back of the hinge and is provided with a forwardly curved portion 31 engaging the back of the casing 10.

The side portions of the spring are provided with openings through which the ends of the pin 15 extend, and the spring is so shaped that when thus assembled a strong rearward tension is applied to the pin 15.

As the hinge is opened and the member 11 is moved to the dotted line position shown in Fig. 1, the cam portion 22 of the hinge member coacts with the cam roll 20 to shift the axis of the hinge member 11 and its pivot pin 15 forward or to the right in Figs. 1 and 3. Such movement is permitted by the slots 16 and is yieldingly resisted by the spring 30. The action of the cam is slightly delayed to permit the opposite edge of the door to clear the casing. As the door is closed, the spring 30 retracts the hinge member 11, and all parts return to their original positions.

From the preceding description of my invention it will be seen that I have provided a construction by which substantially increased clearance may be obtained in a hinge of the gooseneck type, thus adapting this type of hinge to a purpose for which it was not previously available.

In the claim, the expression, "shift . . . transversely", is used to indicate movement in the plane of the door and toward or away from the adjacent edge of the door.

Having thus described my invention and the advantages thereof, I do not wish to be limited to the details herein disclosed, otherwise than as set forth in the claim, but what I claim is:—

A hinge comprising a casing, a hinge member having end portions connected by a gooseneck arm, a pivot pin for said member slidably mounted in said casing, a cam roll mounted in said casing, said member having a cam portion on the inner face of said gooseneck arm coacting with said cam roll to shift the axis of said pin and member in a sliding movement transversely forward relative to the hinge casing as the hinge is opened, and a spring to resist such movement and to restore said parts to initial position as the hinge is closed.

EMIL B. G. LEFEVRE.